United States Patent [19]

Awotwi et al.

[11] Patent Number: 5,503,428
[45] Date of Patent: Apr. 2, 1996

[54] VEHICLE SEAT WITH AN INFLATABLE AIR CUSHION

[75] Inventors: S. Ato Awotwi, Lathrup Village; Elaine S. Schultz, Troy, both of Mich.

[73] Assignee: Hoover Universal, Inc., Plymouth, Mich.

[21] Appl. No.: 382,862

[22] Filed: Feb. 3, 1995

[51] Int. Cl.⁶ ................................................ B60R 21/22
[52] U.S. Cl. ................ 280/730.2; 280/739; 297/216.13
[58] Field of Search ............................ 280/730.2, 730.1, 280/728.2, 728.1, 739, 736, 742; 297/216.13, 216.1

[56] References Cited

U.S. PATENT DOCUMENTS

| | | | |
|---|---|---|---|
| 4,817,828 | 4/1989 | Goetz | 280/736 |
| 4,946,191 | 8/1990 | Putsch | 280/730.2 |
| 5,112,079 | 5/1992 | Haland et al. | 280/730.2 |
| 5,222,761 | 6/1993 | Kaji et al. | 280/730.2 |
| 5,251,931 | 10/1993 | Semchena et al. | 280/730.1 |
| 5,324,071 | 6/1994 | Gotomyo et al. | 280/730.1 |
| 5,348,342 | 9/1994 | Haland et al. | 280/730.2 |

FOREIGN PATENT DOCUMENTS

| | | | |
|---|---|---|---|
| 3-281455 | 12/1991 | Japan | 280/730.2 |
| 4-356246 | 12/1992 | Japan | 280/730.2 |

Primary Examiner—Margaret A. Focarino
Assistant Examiner—Peter C. English
Attorney, Agent, or Firm—Harness, Dickey & Pierce

[57] ABSTRACT

A vehicle seat with an inflatable air cushion in which an air cushion module comprising the inflatable air cushion and a gas generator for inflating the air cushion is mounted to a hollow member of the seat frame. The gas generator is substantially contained within the seat frame to minimize the packaging space required for the air cushion module. In addition, back pressure release gas from the gas generator is directed into the hollow interior of the frame to avoid the discharge of hot gas directly into the seat foam where the foam may be damaged by the heat.

10 Claims, 3 Drawing Sheets

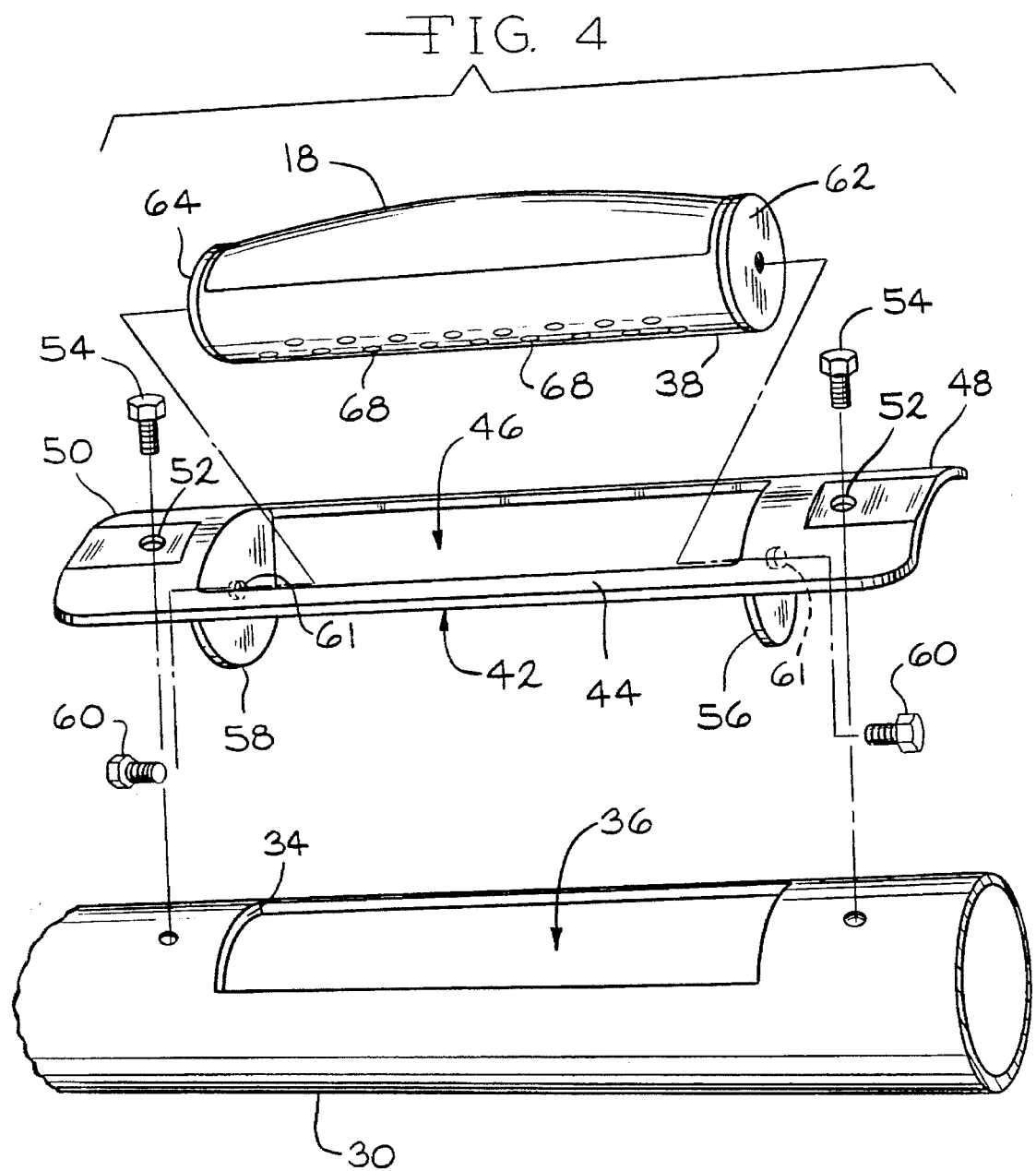

VEHICLE SEAT WITH AN INFLATABLE AIR CUSHION

BACKGROUND AND SUMMARY OF THE INVENTION

The present invention relates generally to vehicle seat assemblies and in particular to a seat assembly having an inflatable air cushion mounted to the seat frame.

In recent years automobile manufacturers have directed increasing attention to providing improved side impact protection for vehicle occupants. One method of doing so is to provide an inflatable side impact air cushion mounted to either the vehicle seat or the door adjacent to the vehicle seat.

To provide an air cushion module in a vehicle seat having a folded air cushion and a gas generator, two difficulties must be overcome. The first is that of packaging the air cushion module within the seat. When an air cushion module is added to a seat, care must be taken to ensure that acceptable foam thicknesses are maintained for seating comfort. However, the foam thickness cannot simply be increased to cover the added air cushion module. Increasing the foam thickness adds to the size and weight of the seat assembly, both of which are counterproductive as auto makers seek to build smaller and more fuel efficient automobiles.

Accordingly, it is one object of the present invention to provide an air cushion module in a seat and to package the air cushion module in the seat assembly without significantly increasing the size and the weight of the seat.

The seat of the present invention overcomes the packaging difficulties by installing the air cushion module within the hollow interior of a seat frame component. By placing the module within the seat frame as opposed to mounting the module to the seat frame exterior, there is little, if any, added structure which must be covered with foam. An additional advantage flows from mounting the module in the seat frame. In order to place the module in a frame having a closed cross-sectional shape, an opening must be formed in the frame by removing a portion of the frame wall. By removing a portion of the frame material, the frame weight is reduced. This weight reduction would not occur if the air cushion module is simply mounted to the exterior of the seat frame.

The second difficulty in providing a seat air cushion relates to the provision of a path for back pressure release gas from the gas generator. The gas generator, when provided in a seat assembly, is typically surrounded by the seat foam cushion. There is a concern that the release of back pressure gas into the foam can excessively heat the foam, resulting in foam damage. This difficulty with the back pressure release is not present in front impact air cushions that are mounted within an instrument panel or steering wheel since they are not surrounded by foam. Likewise, side impact air cushions mounted in a vehicle door are not surrounded by foam either. Accordingly, it is another object of the present invention to provide a back pressure release passage which avoids the release of hot gases directly into the foam.

The seat assembly of the present invention overcomes this difficulty by releasing the back pressure gas into the hollow interior of the seat frame. The seat frame provides a large accumulator for released gases, allowing the gases to cool before they ultimately dissipate through various apertures in the seat frame into the surrounding foam. As a result, there is no damage to the seat cushion foam caused by the release of hot gases directly into the foam.

Further objects, features and advantages of the invention will become apparent from a consideration of the following description and the appended claims when taken in connection with the accompanying drawings.

BRIEF DESCRIPTION OF THE DRAWINGS

FIG. 4 is an exploded perspective view of the air cushion module and mounting bracket.

DETAILED DESCRIPTION OF THE PREFERRED EMBODIMENT

Figure 1:
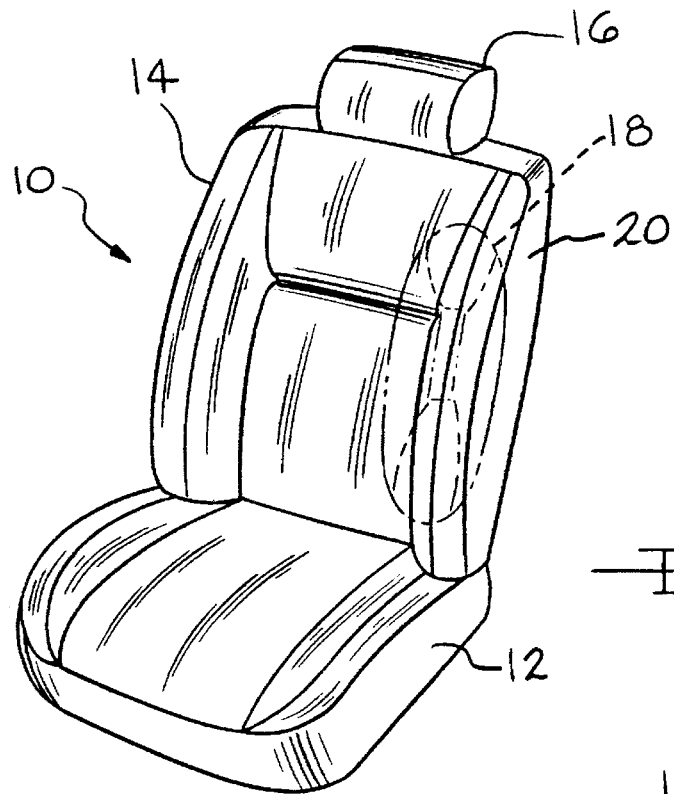
FIG. 1 is a perspective view of a vehicle seat having a side impact air cushion according to the present invention illustrating the air cushion deployed.

A vehicle seat having an air cushion mounted thereto according to the present invention is shown in FIG. 1 and designated generally at 10. The seat 10 includes a lower seat cushion 12 and a generally upright seat back 14 extending upwardly from the rear of the cushion 12. A head restraint 16 is positioned at the upper end of the seat back 14. An inflatable air cushion 18, mounted to the seat back 14, is shown deployed along the side 20 of the seat back. The air cushion 18 provides side impact protection for an occupant seated in the seat 10 during a vehicle collision. While the invention is illustrated with the air cushion as being mounted to the seat back, the invention can also be practiced with the air cushion mounted to the lower seat cushion 12. The present invention is not limited to a single location of the air cushion in the seat.

Figure 2:
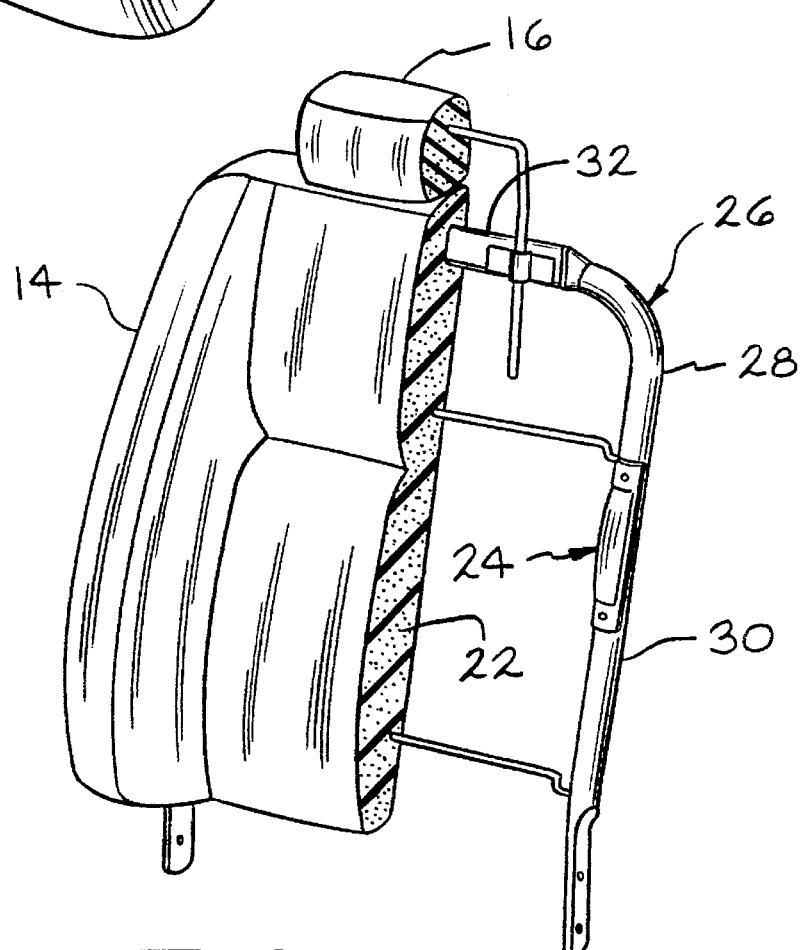
FIG. 2 is a cut away perspective view illustrating the seat back frame with the air cushion module mounted thereto.

With reference to FIG. 2, the seat back 14 is shown with a portion of the seat cushion foam pad 22 cut away to reveal the frame 26 of the seat back and the air cushion module 24. The seat back frame 26 is generally U-shape having a first upright member 30, an upper cross member 32 and a second upright member on the opposite side of the seat back (not shown). The invention is not limited to a frame having a circular cross-sectional shape as shown. The invention can be utilized with a frame having any of a variety of cross-sectional shapes, including, but not limited to circular, oval, square, rectangular, etc. In addition, the cross-sectional shape of the frame may also vary along its length.

Figure 3:
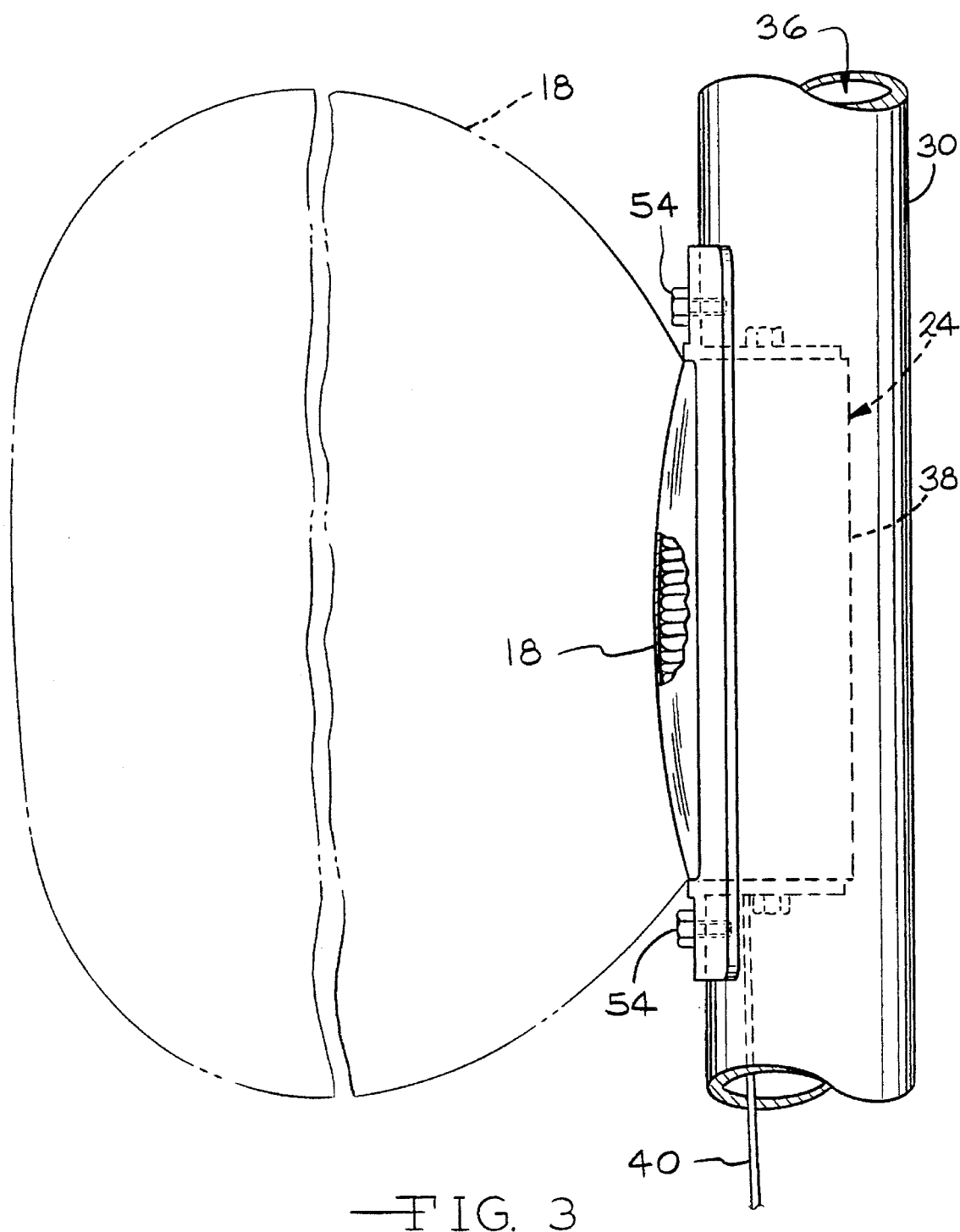
FIG. 3 is a side view of the seat back frame and air cushion module.

The air cushion module 24 is substantially disposed within the upright member 30 of the seat back frame as shown in FIG. 3. An opening 34 in the frame allows the module to be placed in the hollow interior 36 of the seat back frame. The module includes a gas generator 38 and the folded air cushion 18. Depending upon the size of the module, a portion of the module may protrude from the frame interior. A wire 40 is connected to the gas generator and extends through the frame upright member 30. The wire 40 is connected to a sensor mounted elsewhere on the vehicle for actuating the gas generator to inflate the air cushion 18. By routing the wire 40 through the frame interior, there is no need to modify the shape of the foam pad 22 to provide a path for the wire.

A bracket 42 is used to mount the air cushion module to the seat back frame. The bracket 42 is shown in greater detail in FIG. 4. The bracket 42 has a front plate 44 with an opening 46 therethrough. When attached to the frame, the opening 46 in the bracket overlies the opening 34 in the frame. The plate 44 of the bracket includes ears 48, 50 which overlie the exterior surface of the frame. The ears have apertures 52 for attaching the bracket to the frame by screws or other fasteners 54. The bracket 42 surrounds the opening in the upright member 30 and provides strength to the upright member 30. The added strength from the bracket compensates for the material removed from the frame to form the opening 34 in the upright member.

The bracket 42 also has a pair of flanges 56, 58 which extend into the seat back frame. The flanges 56, 58 are used to attach the gas generator 38 to the bracket with screws or bolts 60. The screws 60 extend through mounting apertures 61 in the flanges and into the ends 62, 64 of the gas generator.

Excessive back pressure in the generator 38 is discharged through apertures 68 in the generator housing into the interior of the hollow tube 28 forming the back frame. The hollow interior of the frame provides a collector for the discharged gas, enabling the gas to cool before it eventually passes through various openings in the seat back frame into the surrounding foam. As a result, excessive heating and damage to the foam is prevented.

The seat of the present invention provides for easy packaging of an air cushion module within the seat by placing the module within the hollow interior of the seat frame. By utilizing the existing space in the seat frame for the air cushion module, the need for additional foam to properly surround the air cushion module is minimizing the increased size and weight of the seat from the added foam. Furthermore, the generator back pressure release gas is directed into the hollow interior of the seat frame, avoiding damage to the seat foam caused by excessive heating.

It is to be understood that the invention is not limited to the exact construction illustrated and described above, but that various changes and modifications may be made without departing from the spirit and scope of the invention as defined in the following claims. For example, while the invention has been illustrated and described with a seat frame having a closed cross-sectional shape such as a circle or oval, the invention is not limited to a frame with a closed sectional shape. An open C-shape or I-beam section, which defines an interior space, can be utilized as well. The open cross-sectional shape still provides the hollow interior space in which the air cushion module can be placed to provide the packaging benefits of the invention. However, with an open cross-sectional shape, there is no ability to collect the hot release gas from the generator.

We claim:

1. In a vehicle seat, a frame having a frame member with a closed cross sectional shape defining a hollow interior space, and an air cushion module including an inflatable air cushion and a gas generator for inflating said air cushion mounted to said frame member with said gas generator being substantially disposed within said frame member interior space whereby the increase in size of the vehicle seat due to the addition of said air cushion module is minimized.

2. The vehicle seat of claim 1 wherein said frame member has an opening therein into said hollow interior space into which said air cushion module is placed to dispose said air cushion module in said interior space.

3. The vehicle seat of claim 2 further comprising a mounting bracket attached to said gas generator and to said frame member to affix said gas generator to said frame member, said bracket having a face plate which overlays said opening in said frame member, said face plate having a second opening therethrough which is aligned with said opening in said frame member whereby said bracket face plate surrounds said opening in said frame member to reinforce said frame member.

4. The vehicle seat of claim 2 wherein said gas generator has a back pressure release outlet directed into said hollow interior space of said frame member whereby release gas is directed from said generator into said hollow interior space of said frame member.

5. The vehicle seat of claim 1 further comprising connecting means extending through said hollow interior space of said frame member for connecting said gas generator to a sensor for actuating said gas generator to inflate said air cushion.

6. In a vehicle seat, a frame having a frame member with a hollow interior space, and an air cushion module including an inflatable air cushion and a gas generator for inflating said air cushion mounted to said frame member, said gas generator having a back pressure release passage directed into said hollow interior space of said frame member and said frame member having a closed cross-sectional shape at the location of said back pressure release passage whereby release gas is directed from said gas generator into said hollow interior space of said frame member.

7. In a seat back for a vehicle seat, a frame having a frame member with a closed cross sectional shape defining a hollow interior space, said frame member having an opening therethrough into said hollow interior space, an air cushion module having an inflatable air cushion and a gas generator for inflating said air cushion mounted to said frame member with said gas generator being substantially disposed within said interior space of said frame member at said opening.

8. The seat back of claim 7 wherein said gas generator has a back pressure release directed into said hollow interior space of said frame member whereby release gas is directed from said gas generator into said frame member.

9. The seat back of claim 7 further comprising a mounting bracket attached to said gas generator and to said frame member to affix said gas generator to said frame member, said mounting bracket including a plate which surrounds said opening in said frame member to strengthen said frame member at said opening.

10. The seat back of claim 7 further comprising connecting means extending through said hollow interior space of said frame member for connecting said gas generator to a sensor for actuating said gas generator to inflate said air cushion.

* * * * *